(12) United States Patent
Fripp et al.

(10) Patent No.: US 9,790,763 B2
(45) Date of Patent: Oct. 17, 2017

(54) DOWNHOLE TOOLS COMPRISING CAST DEGRADABLE SEALING ELEMENTS

(71) Applicant: Halliburton Energy Services, Inc., Houston, TX (US)

(72) Inventors: Michael Linley Fripp, Carrollton, TX (US); Zachary William Walton, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/890,775

(22) PCT Filed: Jun. 15, 2015

(86) PCT No.: PCT/US2015/035812
§ 371 (c)(1),
(2) Date: Nov. 12, 2015

(87) PCT Pub. No.: WO2016/007259
PCT Pub. Date: Jan. 14, 2016

(65) Prior Publication Data
US 2016/0177655 A1    Jun. 23, 2016

Related U.S. Application Data

(63) Continuation of application No. PCT/US2014/045535, filed on Jul. 7, 2014.

(51) Int. Cl.
E21B 33/12    (2006.01)
E21B 33/128    (2006.01)
(Continued)

(52) U.S. Cl.
CPC .............. *E21B 33/12* (2013.01); *E21B 29/02* (2013.01); *E21B 33/128* (2013.01);
(Continued)

(58) Field of Classification Search
CPC ..... E21B 33/12; E21B 33/1208; E21B 33/128
See application file for complete search history.

(56) References Cited

U.S. PATENT DOCUMENTS 3,193,522 A    7/1965    Neumann et al.
5,883,199 A    3/1999    McCarthy et al.
(Continued)

FOREIGN PATENT DOCUMENTS

WO    WO-2014/000141 A1    1/2014
WO    2014192885 A1    12/2014
(Continued)

OTHER PUBLICATIONS

International Search Report dated May 2, 2016 for International Application No. PCT/US2015/06786.
(Continued)

*Primary Examiner* — Amber R Anderson
*Assistant Examiner* — Aaron L Lembo
(74) *Attorney, Agent, or Firm* — McDermott Will & Emery LLP

(57) ABSTRACT

Downhole tools including a body, wherein at least a portion of the body is degradable when exposed to a wellbore environment; and at least one degradable sealing element comprising a cast degradable elastomer, wherein at least a portion of the cast degradable sealing element degrades when exposed to the wellbore environment.

27 Claims, 3 Drawing Sheets

(51) Int. Cl.
*E21B 43/26* (2006.01)
*E21B 29/02* (2006.01)
*E21B 33/129* (2006.01)

(52) U.S. Cl.
CPC ........ *E21B 33/1208* (2013.01); *E21B 33/129* (2013.01); *E21B 43/26* (2013.01)

(56) References Cited

U.S. PATENT DOCUMENTS

| | | | |
|---|---|---|---|
| 6,076,600 A | 6/2000 | Vick, Jr. et al. | |
| 7,168,494 B2 | 1/2007 | Starr et al. | |
| 7,699,101 B2 | 4/2010 | Fripp et al. | |
| 7,946,351 B2 | 5/2011 | Freyer | |
| 8,127,856 B1 | 3/2012 | Nish et al. | |
| 8,181,708 B2 | 5/2012 | Korte et al. | |
| 8,586,507 B2 | 11/2013 | Deville | |
| 8,720,556 B2 * | 5/2014 | Todd ............... | C09K 8/035 166/280.1 |
| 8,726,992 B2 | 5/2014 | Freyer | |
| 2005/0205264 A1 | 9/2005 | Starr et al. | |
| 2005/0205266 A1 | 9/2005 | Todd et al. | |
| 2005/0230107 A1 * | 10/2005 | McDaniel ........... | E21B 43/25 166/249 |
| 2007/0027245 A1 | 2/2007 | Vaidya et al. | |
| 2007/0107908 A1 | 5/2007 | Vaidya et al. | |
| 2010/0139930 A1 | 6/2010 | Patel et al. | |
| 2011/0005778 A1 | 1/2011 | Foster et al. | |
| 2011/0240293 A1 | 10/2011 | Lesko et al. | |
| 2012/0080189 A1 | 4/2012 | Marya et al. | |
| 2012/0267111 A1 | 10/2012 | Khlestkin | |
| 2013/0025859 A1 | 1/2013 | Liang et al. | |
| 2013/0062072 A1 | 3/2013 | Alvarez et al. | |
| 2013/0133887 A1 * | 5/2013 | Todd ............... | C09K 8/035 166/281 |
| 2013/0161024 A1 * | 6/2013 | Greci ............... | E21B 43/08 166/376 |
| 2013/0233546 A1 | 9/2013 | Liang et al. | |
| 2013/0292123 A1 | 11/2013 | Murphree et al. | |
| 2014/0076571 A1 | 3/2014 | Frazier et al. | |
| 2016/0222752 A1 | 8/2016 | Fripp et al. | |
| 2016/0290090 A1 | 10/2016 | Murphree et al. | |

FOREIGN PATENT DOCUMENTS

| | | |
|---|---|---|
| WO | 2016007119 A1 | 1/2016 |
| WO | 2016007259 A1 | 1/2016 |
| WO | 2016007260 A1 | 1/2016 |

OTHER PUBLICATIONS

International Search Report and Written Opinon for PCT/US2015/035812 dated Aug. 28, 2015.
Ali et al., "Synthesis of biodegradable and flexible, polyactic acid based, thermoplastic polyurethane with high gas barrier properties," Polymer Inernational, Sep. 2014.
Carbodimide in Millanthane 5004 (2004) retrieved from http://www.tse-industries.com/sites/default/files/techinfo/M5004_Carbodimide_39686.pdf.
Hydrolysis Stabilizer for Polyesters Including Bio-plastics (2009, retrieved from http://www.nisshinbo-chem.co.jp/english/products/carbodilite/poly.html.
International Search Report and Written Opinion dated Apr. 7, 2015 from PCT/US2014/045535.
International Search Report and Written Opinion dated Aug. 28, 2015 from PCT/US2015/035823.
Liu et al., "Mechanical properties, water-swelling behavior, and morphology of water-swellable rubber prepared using crosslinked sodium poiyacrylate," J Applied Polymer Science, vol. 102(2) pp. 1489-1496, Oct. 15, 2006.
Tanrattanakul et al., "Effect of differnet plasticizers on the properties of bio-based thermoplastic elastomer containing poly(lactic acid) and natural rubber," eXPRESS Polymer Letters, Jan. 2014.
Usuki et al., "Preparation and properties of EPDM-clay hybrids," Polymer, vol. 43(8), pp. 2186-2189. Apr. 2002.
Vroman et al., "Biodegradable Polymers," Materials, 2009, vol. 2, pp. 307-344.
Australian Examination Report from Australian Patent Application No. 2014400642, dated Mar. 9, 2017.
Australian Examination Report from Australian Patent Application No. 2015288256, dated Mar. 9, 2017.

* cited by examiner

DOWNHOLE TOOLS COMPRISING CAST DEGRADABLE SEALING ELEMENTS

CROSS-REFERENCE TO RELATED APPLICATIONS

This application is a continuation-in-part of PCT/US2014/045535, titled "Downhole Tools Comprising Aqueous-Degradable Sealing Elements," and filed Jul. 7, 2014.

BACKGROUND

The present disclosure generally relates to downhole tools comprising cast degradable sealing elements and, more specifically, to downhole tools comprising a body and a cast degradable sealing element, wherein at least a portion of the body is also degradable upon exposure to a wellbore environment.

A variety of downhole tools are within a wellbore in connection with producing or reworking a hydrocarbon bearing subterranean formation. The downhole tool may comprise a wellbore zonal isolation device capable of fluidly sealing two sections of the wellbore from one another and maintaining differential pressure (i.e., to isolate one pressure zone from another). The wellbore zonal isolation device may be used in direct contact with the formation face of the wellbore, with casing string, with a screen or wire mesh, and the like.

After the production or reworking operation is complete, the seal formed by the downhole tool must be broken and the tool itself removed from the wellbore. The downhole tool must be removed to allow for production or further operations to proceed without being hindered by the presence of the downhole tool. Removal of the downhole tool(s) is traditionally accomplished by complex retrieval operations involving milling or drilling the downhole tool for mechanical retrieval. In order to facilitate such operations, downhole tools have traditionally been composed of drillable metal materials, such as cast iron, brass, or aluminum. These operations can be costly and time consuming, as they involve introducing a tool string (e.g., a mechanical connection to the surface) into the wellbore, milling or drilling out the downhole tool (e.g., at least breaking the seal), and mechanically retrieving the downhole tool or pieces thereof from the wellbore to bring to the surface.

To reduce the cost and time required to mill or drill a downhole tool from a wellbore for its removal, degradable downhole tools have been developed. Traditionally, however, such degradable downhole tools have been designed only such that the degradable portion includes the tool body itself and not any sealing element of the downhole tool. This is particularly evident because the degradable materials that have been proposed for use in forming a downhole tool body are often highly brittle and are physically or chemically incapable of exhibiting expansive or elastic properties necessary for a sealing element. Instead, the known degradable downhole tools may degrade such that it no longer provides the structural integrity necessary for achieving an effective seal with the non-degradable sealing element.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
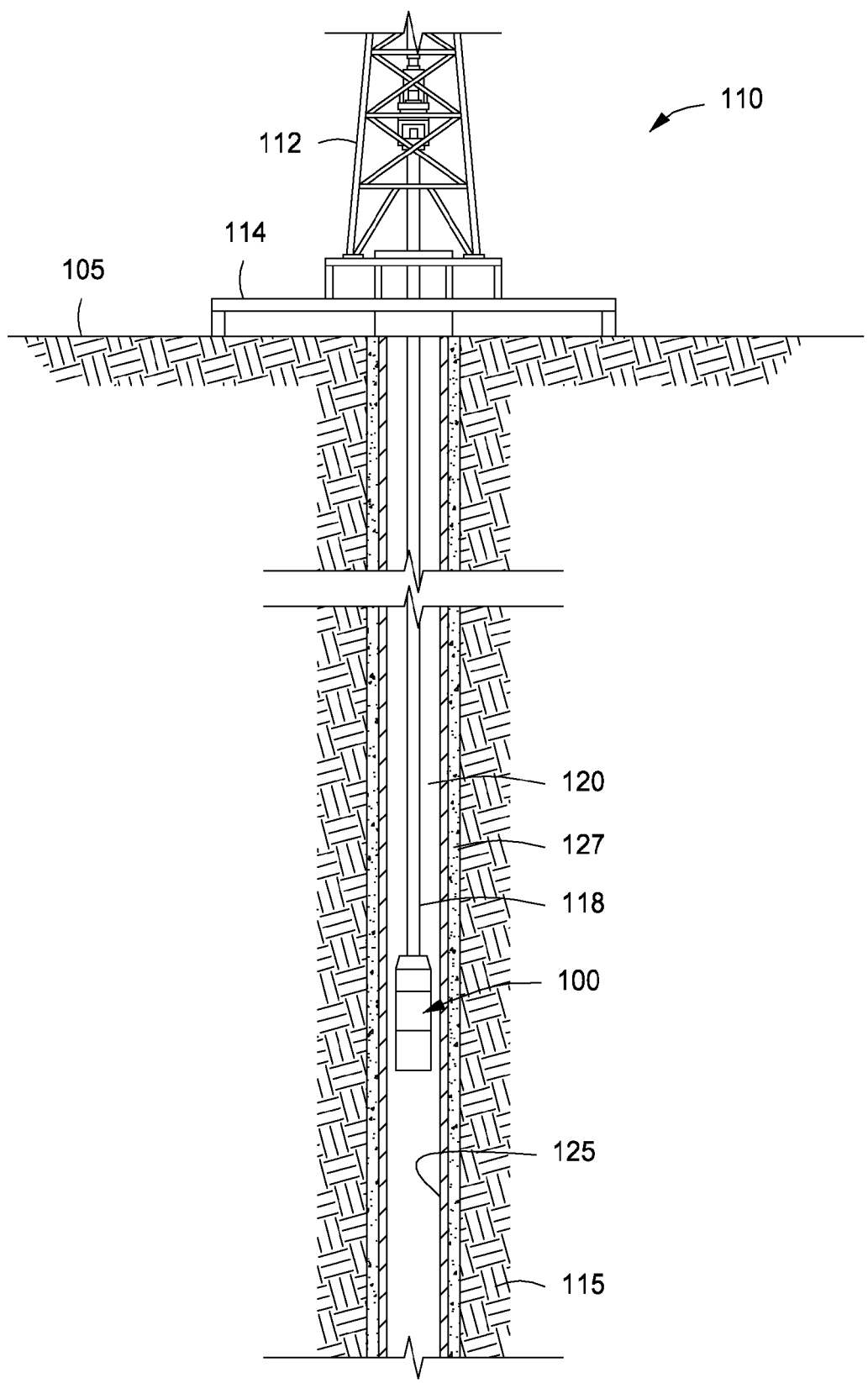
FIG. 1 illustrates a cross-sectional view of a well system comprising a downhole tool, according to one or more embodiments described herein.

The present disclosure generally relates to downhole tools comprising cast degradable sealing elements and, more specifically, to downhole tools comprising a body and a cast degradable sealing element, wherein at least a portion of the body is also degradable upon exposure to a wellbore environment. As used herein, the term "cast," and grammatical variants thereof (e.g., "casting," and the like) refers to a manufacturing process in which a mold is filled with a liquid resin (e.g., the degradable elastomer described herein), followed by hardening. Hardening is a polymerization process meaning that the cast elastomers (which also may be referred to as cast resins) are polymerized, typically through heat, a chemical reaction, or irradiation. In many cases, the cast elastomers described herein are considered "thermoset," meaning that once hardened, the elastomer cannot be heated and melted to be shaped differently. In other cases, the cast elastomers are considered "thermoplastic," meaning that once hardened, the polymer can be heated and melted to be shaped differently. In some embodiments, a thermoset cast elastomer may be preferred for uses in downhole environments, particularly those having high temperatures where the cast elastomer may soften, melt, or become misshapen. As used herein, the term "cast degradable elastomer," and grammatical variants thereof, refers to a degradable elastomer as described herein made by casting.

As used herein, the term "degradable" and all of its grammatical variants (e.g., "degrade," "degradation," "degrading," and the like) refers to the dissolution or chemical conversion of materials into smaller components, intermediates, or end products by at least one of solubilization, hydrolytic degradation, biologically formed entities (e.g., bacteria or enzymes), chemical reactions, thermal reactions, or reactions induced by radiation. The term "at least a portion" with reference to degradation (e.g., "at least a portion of the body is degradable" or "at least a portion of the degradable sealing element is degradable," and grammatical variants thereof) refers to degradation of at least about 80% of the volume of that part. In some instances, the degradation of the material may be sufficient for the mechanical properties of the material to reduce to a point that the material no longer maintains its integrity and, in essence, falls apart. The conditions for degradation are generally wellbore conditions where an external stimulus is not used to initiate or affect the rate of degradation. However, an external stimulus may be used; for example, the pH of the fluid that interacts with the material may be changed by introduction of an acid or a base. The term "wellbore environment" includes both naturally occurring wellbore environments and introduced materials into the wellbore.

Disclosed are various embodiments of a downhole tool including a cast degradable sealing element capable of fluidly sealing two sections of a wellbore (which may be also referred to as "setting" the downhole tool). The downhole tool may have various setting mechanisms for fluidly sealing the sections of the wellbore with the sealing element including, but not limited to, hydraulic setting, mechanical setting, setting by swelling, setting by inflation, and the like. The downhole tool may be a well isolation device, such as a frac plug, a bridge plug, or a packer, a wiper plug, a cement plug, or any other tool requiring a sealing element for use in a downhole operation. Such downhole operations may include, but are not limited to, any type of fluid injection operation (e.g., a stimulation/fracturing operation, a pinpoint acid stimulation, casing repair, and the like), and the like. In some embodiments, the downhole tool may comprise a body and at least one sealing element composed of a cast degradable elastomer. The cast degradable sealing element may degrade in a wellbore environment, such as upon contact with an aqueous fluid therein. As discussed in detail below, degradation of the cast degradable sealing element may be accelerated, rapid, or normal, degrading anywhere from about 2 hours to about 120 days from first contact with a stimulus (e.g., an aqueous fluid).

In some embodiments, at least a portion of the body itself may also be degradable upon exposure to the wellbore environment. The embodiments herein permit fluid sealing of two wellbore sections with a downhole tool having a cast degradable sealing element that later degrades in situ, preferably without the need to mill or drill, and retrieve the downhole tool from the wellbore. In particular, the degradation of the cast degradable sealing element results in failure of the sealing element to maintain differential pressure and form an effective seal. In such cases, the downhole tool may drop into a rathole in the wellbore without the need for retrieval or may be sufficiently degraded in the wellbore so as to be generally indiscernible. It will be appreciated by one of skill in the art that while the embodiments herein are described with reference to a downhole tool, the cast degradable sealing elements disclosed herein may be used with any wellbore operation equipment that may preferentially degrade upon exposure to a stimuli, such as aqueous fluids.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressed in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Traditional sealing elements, whether degradable or non-degradable, as well as any flexible portion of a downhole tool are formed by a molding process. The molding process is traditionally either an injection molding process, a compression molding process, or an extrusion molding process. As described herein, the term "molding," and grammatical variants thereof (e.g., "molding process," and the like), refers to a manufacturing process in which solid resin is heated into a pliable solid and shaped with a die. The term encompasses dies that produce particular shaped materials, and those that produce long-continuous shapes (e.g., tubes or cylinders, and the like). Molding typically requires a molding machine including various parts, such as a hopper, a heater, a reciprocating screw, a mold cavity, a removable platen, among others. The machine may be costly, require a large equipment footprint, and require costly and time-consuming cleaning processes. Additionally, single molds are made for each desired shape, and are made by technical toolmakers out of a metal (e.g., steel or aluminum) and thereafter precision-machined to form desired features. Accordingly, a new metal mold must be precision-tooled for each and every desired shape and feature. Molding further requires high pressure and high velocity injection of the molten resin into the die cavity, which requires careful monitoring to ensure that pressure and velocity spikes do not occur, which may result in an inadequate or flawed molded material that cannot be used. Traditional molding is additionally a complex technology, fraught with potential production problems. Such problems may render the final downhole tool component unusable, requiring production delays and costly repairs and/or repetition of the process. Such problems may include blistering, delamination, resin degradation, machine particulate contaminates, sinking, voids, warping, and the like.

Unlike traditional molded resins, the cast process for the degradable elastomers described herein is performed by utilizing the liquid phase of the degradable elastomer and a low-cost mold at reduced temperatures and low pressures, typically atmospheric pressure. No complex, costly, or large machinery is required for forming the cast degradable elastomers of the present disclosure. Accordingly, advantages of the cast degradable materials described herein include reduced costs, reduced equipment footprint, reduced operator time, and the like, compared to traditional downhole tools comprising only injection molded components.

Cast molds may be flexible and made of low cost materials, such as latex rubber, room temperature vulcanized silicone rubber, or other rubbers. Cast molds may also be constructed from metals such as aluminum or steel, or from plastics such as polytetrafluoroethylene (Teflon). The cast degradable resins described herein may be formed using gravity casting (i.e., mere use of gravity to fill the mold), vacuum casting (i.e., pulling a vacuum to fill the mold), pressure casting (i.e., applying a small pressure to compress any bubbles within the resin), and any combination thereof. Vacuum casting may further be used simply to remove any bubbles or other imperfections, as well as vibration, pressure, or centrifugation.

Typically, the pressure used for forming the cast degradable materials of the present disclosure may be from about 0.1 pounds per square inch (psi) to about 250 psi, encompassing every value and subset therebetween. One (1) psi is equal to 6894.757 pascals. The temperature used for forming the cast degradable materials of the present disclosure may be from about 20° C. to about 150° C., encompassing every value and subset therebetween. Each of these values is critical to the embodiments of the present disclosure and may depend on a number of factors including, but not limited to, the type of degradable elastomer selected, any additives included in the degradable elastomer, the downhole tool component created (e.g., the sealing element), and the like, and combinations thereof.

Referring now to FIG. 1, illustrated is an exemplary well system 110 for a downhole tool 100. As depicted, a derrick 112 with a rig floor 114 is positioned on the earth's surface 105. A wellbore 120 is positioned below the derrick 112 and the rig floor 114 and extends into subterranean formation 115. As shown, the wellbore may be lined with casing 125 that is cemented into place with cement 127. It will be appreciated that although FIG. 1 depicts the wellbore 120 having a casing 125 being cemented into place with cement 127, the wellbore 120 may be wholly or partially cased and wholly or partially cemented (i.e., the casing wholly or partially spans the wellbore and may or may not be wholly or partially cemented in place), without departing from the scope of the present disclosure. Moreover, the wellbore 120 may be an open-hole wellbore. A tool string 118 extends from the derrick 112 and the rig floor 114 downwardly into the wellbore 120. The tool string 118 may be any mechanical connection to the surface, such as, for example, wireline, slickline, jointed pipe, or coiled tubing. As depicted, the tool string 118 suspends the downhole tool 100 for placement into the wellbore 120 at a desired location to perform a specific downhole operation. As previously mentioned, the downhole tool 100 may be any type of wellbore zonal isolation device including, but not limited to, a frac plug, a bridge plug, a packer, a wiper plug, or a cement plug.

It will be appreciated by one of skill in the art that the well system 110 of FIG. 1 is merely one example of a wide variety of well systems in which the principles of the present disclosure may be utilized. Accordingly, it will be appreciated that the principles of this disclosure are not necessarily limited to any of the details of the depicted well system 110, or the various components thereof, depicted in the drawings or otherwise described herein. For example, it is not necessary in keeping with the principles of this disclosure for the wellbore 120 to include a generally vertical cased section. The well system 110 may equally be employed in vertical and/or deviated wellbores, without departing from the scope of the present disclosure. Furthermore, it is not necessary for a single downhole tool 100 to be suspended from the tool string 118.

In addition, it is not necessary for the downhole tool 100 to be lowered into the wellbore 120 using the derrick 112. Rather, any other type of device suitable for lowering the downhole tool 100 into the wellbore 120 for placement at a desired location may be utilized without departing from the scope of the present disclosure such as, for example, mobile workover rigs, well servicing units, and the like. Although not depicted, the downhole tool 100 may alternatively be hydraulically pumped into the wellbore and, thus, not need the tool string 118 for delivery into the wellbore 120.

Although not depicted, the structure of the downhole tool 100 may take on a variety of forms to provide fluid sealing between two wellbore sections. The downhole tool 100, regardless of its specific structure as a specific type of wellbore zonal isolation device, comprises a body and a sealing element. Both the body and the sealing element may each be composed of the same material. Generally, however, the body provides structural rigidity and other mechanical features to the downhole tool 100 and the sealing element is a resilient (i.e., elastic) material capable of providing a fluid seal between two sections of the wellbore 120.

Figure 2:
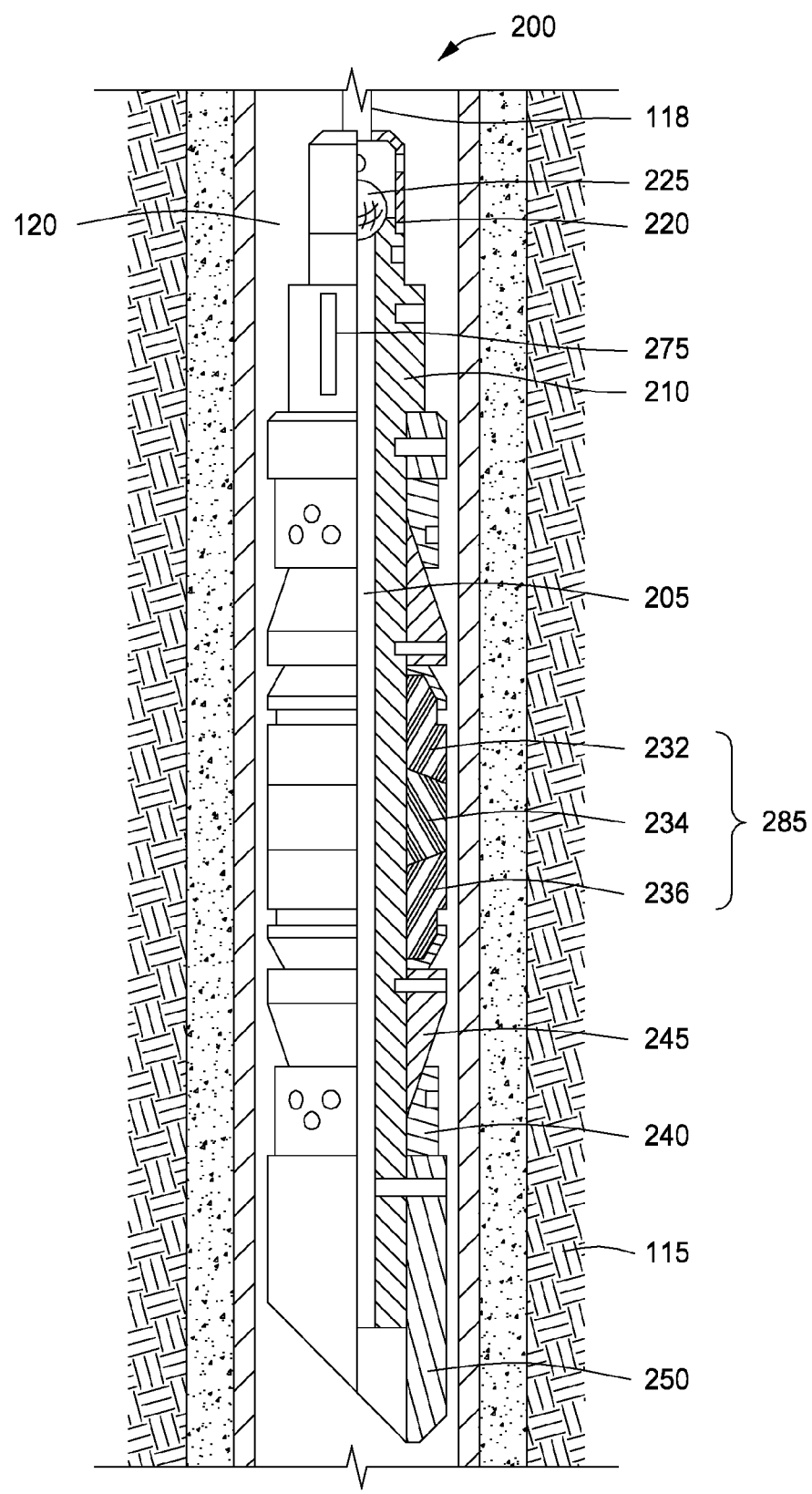
FIG. 2 depicts an enlarged cross-sectional view of a downhole tool, according to one or more embodiments described herein.

Referring now to FIG. 2, with continued reference to FIG. 1, one specific type of downhole tool described herein is a frac plug wellbore zonal isolation device for use during a well stimulation/fracturing operation. FIG. 2 illustrates a cross-sectional view of an exemplary frac plug 200 being lowered into a wellbore 120 on a tool string 118. As previously mentioned, the frac plug 200 generally comprises a body 210 and a sealing element 285. In some embodiments, the sealing element 285 may be resilient and have a Shore A durometer hardness in an amount of from about 60 to about 100, encompassing any value and subset therebetween. For example, the sealing element 285 may have a Shore A durometer hardness in an amount of from about 70 to about 90, or of from about 70 to about 80, or from about 75 to about 85, encompassing any value and subset therebetween. For example, in some embodiments, the sealing element 285 may be resilient and have a Shore A durometer hardness of from about 75 to about 95. Each of these values is critical to the embodiments of the present disclosure and may depend on a number of factors including, but not limited to, the material selected to form the sealing element 285, the operation to be performed by the downhole tool 100 (FIG. 1), the type of downhole tool 100, and the like.

The sealing element 285, as depicted, comprises an upper sealing element 232, a center sealing element 234, and a lower sealing element 236. It will be appreciated that although the sealing element 285 is shown as having three portions (i.e., the upper sealing element 232, the center sealing element 234, and the lower sealing element 236), any other number of portions, or a single portion, may also be employed without departing from the scope of the present disclosure.

As depicted, the sealing element 285 is extending around the body 210; however, it may be of any other configuration suitable for allowing the sealing element 285 to form a fluid seal in the wellbore 120, without departing from the scope of the present disclosure. For example, in some embodiments, the body may comprise two sections joined together by the sealing element, such that the two sections of the body compress to permit the sealing element to make a fluid seal in the wellbore 120. Other such configurations are also suitable for use in the embodiments described herein. Moreover, although the sealing element 285 is depicted as located in a center section of the body 210, it will be appreciated that it may be located at any location along the length of the body 210, without departing from the scope of the present disclosure.

The body 210 of the frac plug 200 comprises an axial flowbore 205 extending therethrough. A cage 220 is formed at the upper end of the body 210 for retaining a ball 225 that acts as a one-way check valve. In particular, the ball 225 seals off the flowbore 205 to prevent flow downwardly therethrough, but permits flow upwardly through the flowbore 205. One or more slips 240 are mounted around the body 210 below the sealing element 285. The slips 240 are guided by a mechanical slip body 245. A tapered shoe 250 is provided at the lower end of the body 210 for guiding and protecting the frac plug 200 as it is lowered into the wellbore 120. An optional enclosure 275 for storing a chemical solution may also be mounted on the body 210 or may be formed integrally therein. In one embodiment, the enclosure 275 is formed of a frangible material.

At least a portion of the body 210 and the sealing element 285 may be composed of a degradable material. Specifically, the sealing element 285 may be at least partially composed of a cast degradable elastomer that degrades, at least in part, in the presence of an aqueous fluid (e.g., a treatment fluid), a hydrocarbon fluid (e.g., a produced fluid in the formation), an elevated temperature, and any combination thereof. That is, the cast degradable elastomer forming at least a portion of the sealing element 285 may wholly degrade or partially degrade; however, the amount of degradation is capable of causing the sealing element 285 to no longer maintain a fluid seal in the wellbore capable of maintaining differential pressure. The aqueous fluid that may degrade the cast degradable elastomer may include, but is not limited to, fresh water, saltwater (e.g., water containing one or more salts dissolved therein), brine (e.g., saturated salt water), seawater, or combinations thereof. Accordingly, the aqueous fluid may comprise ionic salts. The aqueous fluid may come from the wellbore 120 itself (i.e., the subterranean formation) or may be introduced by a wellbore operator. The hydrocarbon fluid may include, but is not limited to, crude oil, a fractional distillate of crude oil, a fatty derivative of an acid, an ester, an ether, an alcohol, an amine, an amide, or an imide, a saturated hydrocarbon, an unsaturated hydrocarbon, a branched hydrocarbon, a cyclic hydrocarbon, and any combination thereof. The elevated temperature may be above the glass transition temperature of the cast degradable elastomer, such as when the cast degradable elastomer is a thiol-based polymer, or may be a temperature greater than about 60° C. (140° F.).

The cast degradable elastomer forming at least a portion of the sealing element 285 (and/or any portion of the body 210 formed by a cast degradable sealing element) of the downhole tool may degrade by a number of mechanisms. For example, the cast degradable elastomer may degrade by swelling, dissolving, undergoing a chemical change, undergoing thermal degradation in combination with any of the foregoing, and any combination thereof. Degradation by swell involves the absorption by the cast degradable elastomer of a fluid in the wellbore environment such that the mechanical properties of the elastomer degrade. That is, the cast degradable elastomer continues to absorb the fluid until its mechanical properties are no longer capable of maintaining the integrity of the cast degradable elastomer and it at least partially falls apart. In some embodiments, a cast degradable elastomer may be designed to only partially degrade by swelling in order to ensure that the mechanical properties of the sealing element 285 and/or body 210 formed from the cast degradable elastomer is sufficiently capable of lasting for the duration of the specific operation in which it is utilized. Degradation by dissolving involves use of a cast degradable elastomer that is soluble or otherwise susceptible to a fluid in the wellbore environment (e.g., an aqueous fluid or a hydrocarbon fluid), such that the fluid is not necessarily incorporated into the elastomer (as is the case with degradation by swelling), but becomes soluble upon contact with the fluid. Degradation by undergoing a chemical change may involve breaking the bonds of the backbone of the cast degradable elastomer (e.g., polymer backbone) or causing the bonds of the cast degradable elastomer to crosslink, such that the cast degradable elastomer becomes brittle and breaks into small pieces upon contact with even small forces expected in the wellbore environment. Thermal degradation of the cast degradable elastomer involves a chemical decomposition due to heat, such as the heat present in a wellbore environment. Thermal degradation of some cast degradable elastomers described herein may occur at wellbore environment temperatures of greater than about 93° C. (or about 200° F.), or greater than about 50° C. (or about 122° F.). Each degradation method may work in concert with one or more of the other degradation methods, without departing from the scope of the present disclosure.

The degradation rate of the cast degradable elastomer may be accelerated, rapid, or normal, as defined herein. Accelerated degradation may be in the range of from about 2 hours to about 36 hours, encompassing any value or subset therebetween. Rapid degradation may be in the range of from about 36 hours to about 14 days, encompassing any value or subset therebetween. Normal degradation may be in the range of from about 14 days to about 120 days, encompassing any value or subset therebetween. Accordingly, the degradation may be in the range of from about 120 minutes to about 120 days, or about 2 hours to about 36 hours, or about 36 hours to about 14 days, or about 14 days to about 120 days, encompassing any value and subset therebetween. Each of these values is critical and depend on a number of factors including, but not limited to, the type of cast degradable elastomer selected, the conditions of the wellbore environment, and the like.

The cast degradable elastomer forming at least a portion of the sealing element 285 and/or a portion of the body 210 may be a material that is at least partially degradable in a wellbore environment including, but not limited to, a polyurethane rubber; a polyester-based polyurethane rubber; a polyether-based polyurethane rubber; a thiol-based polymer; a hyaluronic acid rubber; a polyhydroxobutyrate rubber; a polyester elastomer; a polyester amide elastomer; a starch-based resin (e.g., starch-poly(ethylene-co-vinyl alcohol), a starch-polyvinyl alcohol, a starch-polylactic acid, starch-polycaprolactone, starch-poly(butylene succinate), and the like); a polyethylene terephthalate polymer; a polyester thermoplastic (e.g., polyether/ester copolymers, polyester/ester copolymers, and the like); copolymers thereof; terpolymers thereof; and any combination thereof.

Each of the cast degradable elastomers are at least partially aqueous degradable, but may additionally be degradable by one or more means described previously, without departing from the scope of the present disclosure.

In some embodiments, the cast degradable elastomer selected for use in forming the downhole tools described herein (e.g., the sealing element 285) may be a polyurethane rubber, a polyester-based polyurethane rubber, or a polyether-based polyurethane rubber (collectively simply "polyurethane-based rubbers). These polyurethane-based rubbers degrade in water through a hydrolytic reaction, although other degradation methods may also affect the degradability of the polyurethane-based rubbers. Polyurethane-based rubbers traditionally are formed by reacting a polyisocyanate with a polyol. In the embodiments described herein, although non-limiting, the polyol for forming a polyurethane-based rubber may be a natural oil polyol, a polyester polyol (e.g., polybutadienes (e.g., polybutanediol adipate), polycaprolactones, polycarbonates, and the like), or a polyether polyol (e.g., polytetramethylene ether glycol, polyoxypropylene-glycol, polyoxyethylene glycol, and the like). Because polyether polyols are typically hydrolytically more reactive than polyester polyols and natural oil polyols, polyether polyols may be preferred, particularly when the degradation of the cast degradable elastomer is solely based on aqueous fluid contact and not additionally on other degradation stimuli. However, either polyol may be used to form the polyurethane-based rubber for use as the cast degradable elastomer described herein, and each is critical to the disclosed embodiments, as the amount of desired degradation over time may depend on a number of factors including the conditions of the subterranean formation, the subterranean formation operation being performed, and the like. Combinations of these polyols may also be used, without departing from the scope of the present disclosure.

Accordingly, the rate of hydrolytic degradation of a polyurethane-based rubber for use as the cast degradable elastomers described herein may be adjusted and controlled based on the order of the polyol addition, as well as the polyol properties and quantities. As an example, in some embodiments, the amount of polyol is included in an amount of from about 0.25 to about 2 of the polyisocyanate in the polyurethane-based rubber, encompassing any value and subset therebetween. For example, the amount of polyol included may be in an amount in the range of from about 0.25 to about 1.75, or about 0.5 to about 1.5, or about 0.75 to about 1 stoichiometric ratio of the polyisocyanate in the polyurethane-based rubber, encompassing any value and subset therebetween. Each of these values is critical to the embodiments described herein and may depend on a number of factors including, but not limited to, the desired hydrolytic degradation rate, the type of polyol(s) selected, the type of subterranean operation being performed, and the like.

In some embodiments, the cast degradable elastomer described herein may be formed from a thiol-based polymer. As used herein, the term "thiol" is equivalent to the term "sulfhydryl." The thiol-based polymer may comprise at least one thiol functional group. In some embodiments, the thiol-based polymer may comprise thiol functional groups in the range of from about 1 to about 22, encompassing every value and subset therebetween. For example, of from about 1 to about 5, or about 5 to about 10, or about 10 to about 15, or about 15 to about 22, encompassing any value and subset therebetween. In other embodiments, the thiol-based polymer may comprise even a greater number of thiol functional groups. Each of these values is critical to the embodiments of the present disclosure and may depend on a number of factors including, but not limited to, the desired degradation rate, the desired degradation process, and the like.

The thiol-based polymer may be, but is not limited to, a thiol-ene reaction product, a thiol-yne reaction product, a thiol-epoxy reaction product, and any combination thereof. The thiol-based polymers, whether the reaction product of thiol-ene, thiol-yne, or thiol-epoxy, may be referred to herein as generally being the reaction product of a thiol functional group and an unsaturated functional group, and may be formed by click chemistry. The thiol functional group is an organosulfur compound that contains a carbon-bonded sulfhydryl, represented by the formula —C—SH or R—SH, where R represents an alkane, alkene, or other carbon-containing group of atoms.

Thiol-ene reactions may be characterized as the sulfur version of a hydrosilylation reaction. The thiol-ene reaction product may be formed by the reaction of at least one thiol functional group with a variety of unsaturated functional groups including, but not limited to, a maleimide, an acrylate, a norborene, a carbon-carbon double bond, a silane, a Michael-type nucleophilic addition, and any combination thereof. As used herein, the term "Michael-type nucleophilic addition," and grammatical variants thereof, refers to the nucleophilic addition of a carbanion or another nucleophile to an α,β-unsaturated carbonyl compound, having the general structure (O=C)—C$^{\alpha}$=C$^{\beta}$—. An example of a suitable thiol-ene reaction product may include, but is not limited to, 1,3,5,-triacryloylhexahydro-1,3,5-triazine. Examples of suitable thiol-ene/silane reaction products that may be used in forming at least a portion of the downhole tool 100 (FIG. 1) or component thereof include, but are not limited to, the following Formulas 1-6:

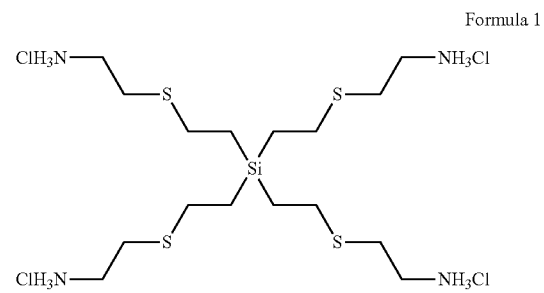

Formula 1

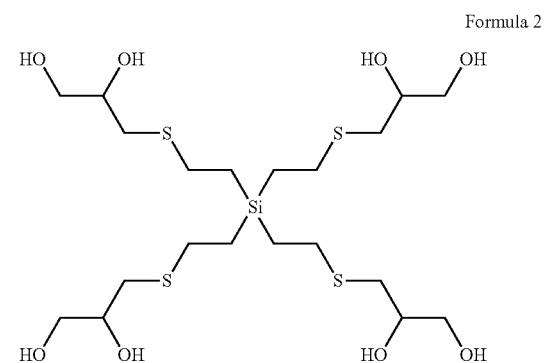

Formula 2

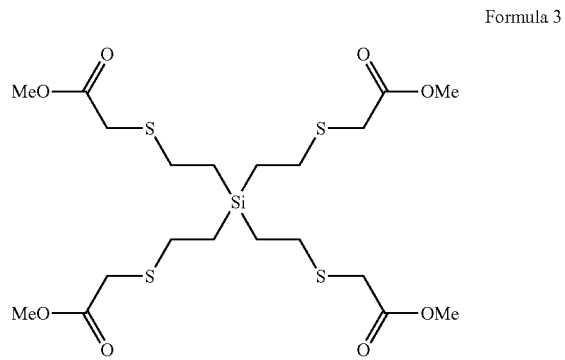

Formula 3

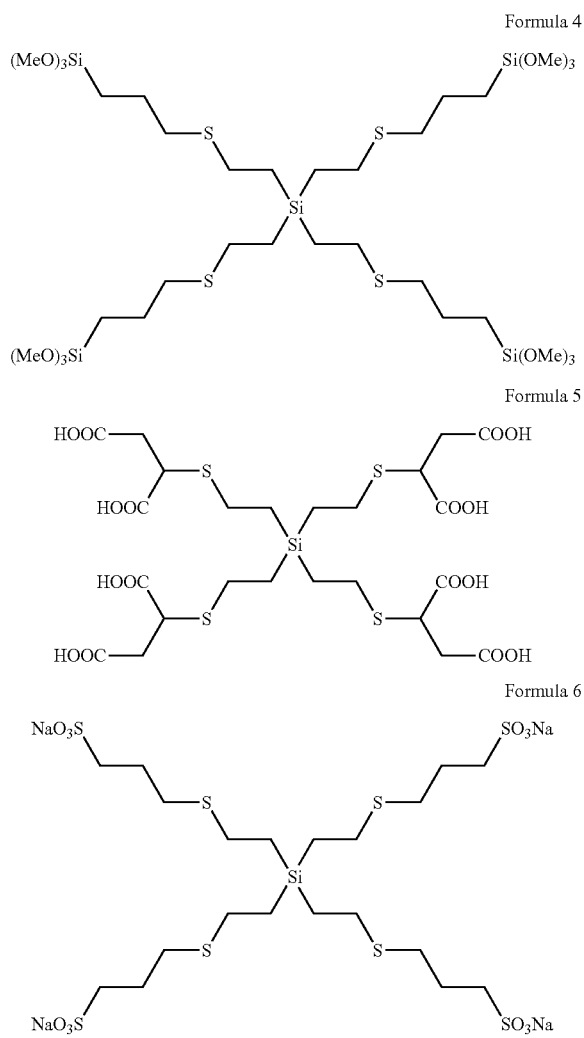

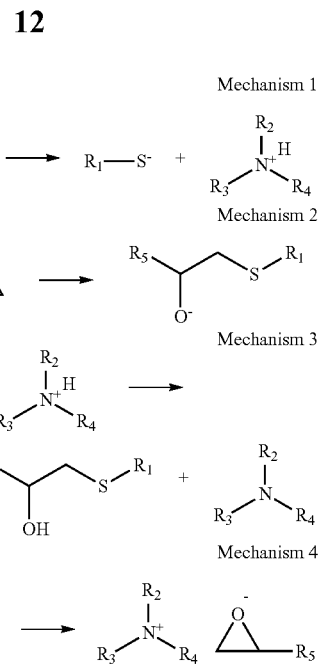

The thiol-yne reaction products may be characterized by an organic addition reaction between a thiol functional group and an alkyne, the alkyne being an unsaturated hydrocarbon having at least one carbon-carbon triple bond. The addition reaction may be facilitated by a radical initiator or UV irradiation and proceeds through a sulfanyl radical species. The reaction may also be amine-mediated, or transition-metal catalyzed.

The thiol-epoxy reaction products may be prepared by a thiol-ene reaction with at least one epoxide functional group. Suitable epoxide functional groups may include, but are not limited to, a glycidyl ether, a glycidyl amine, or as part of an aliphatic ring system. Specific examples of epoxide functional groups may include, but are not limited to, bisphenol-A diglycidyl ether, triglycidylisocyanurate, trimethylolpropane triglycidyl ether, and any combination thereof. The thiol-epoxy reaction products may proceed by one or more of the mechanisms presented below; however, other mechanisms may also be used without departing from the scope of the present disclosure:

As mentioned above, the thiol-based polymer may comprise at least one thiol functional group and at least one degradable functional group. Such degradable functional groups may include, but are not limited to, one or more of a degradable monomer, a degradable oligomer, or a degradable polymer. Specific examples of degradable functional groups may include, but are not limited to, an acrylate, a lactide, a lactone, a glycolide, an anhydride, a lactam, an allyl, a polyethylene glycol, a polyethylene glycol-based hydrogel, an aerogel, a poly(lactide), a poly(glycolic acid), a poly(vinyl alcohol), a poly(N-isopropylacrylamide), a poly (ε-caprolactone, a poly(hydroxybutyrate), a polyanhydride, an aliphatic polycarbonate, an aromatic polycarbonate, a poly(orthoester), a poly(hydroxyl ester ether), a poly(orthoester), a poly(amino acid), a poly(ethylene oxide), a polyphosphazene, a poly(phenyllactide), a poly(hydroxybutyrate), a dextran, a chitin, a cellulose, a protein, an aliphatic polyester, and any combination thereof.

In some embodiments, the thiol-based polymer comprises at least one polyethylene glycol-based hydrogel, such as one formed by a four-arm polyethylene glycol norbornene that is crosslinked with dithiol containing crosslinkers to form a chemically crosslinked hydrogel to impart swelling properties. The swelling properties of such a hydrogel may vary depending on a number of factors including, but not limited to, network density, the degree of crosslinking, and any combination thereof. In some embodiments, the degree of crosslinking may be desirably increased in order to achieve a higher tensile modulus and reduced swelling percentage.

In some embodiments, the cast degradable elastomer forming the sealing element 285 and/or body 210 may have a thermoplastic polymer embedded therein. The thermoplastic polymer may modify the strength, resiliency, or modulus of the cast degradable elastomer. It may also control the degradation rate of the sealing element 285 and/or body 210. Suitable thermoplastic polymers may include, but are not limited to, polypropylene, an aliphatic polyester (e.g., polyglycolic acid, polylactic acid, polycaprolactone, polyhydroxyalkanoate, polyhydroxyalkanoiate, polyhydroxybutyrate, polyethylene adipate, polybutylene succinate, poly(lactic-co-glycolic) acid, poly(3-hydroxybutyrate-co-3-hydroxyvalerate), and any combination thereof. The amount of thermoplastic polymer that may be embedded in the cast degradable elastomer forming the sealing element 285 and/or body 210 may be any amount that confers a desirable elasticity without affecting the desired amount of degradation. In some embodiments, the thermoplastic polymer may be included in an amount of from about 1% to about 91% by weight of the cast degradable elastomer, encompassing any value or subset therebetween. For example, the thermoplastic polymer may be included in an amount of from about 1% to about 30%, or about 30% to about 60%, or about 60% to about 91% by weight of the aqueous-degradable elastomer, encompassing any value and subset therebetween. Each value is critical to the embodiments of the present disclosure and may depend on a number of factors including, but not limited to, the desired elasticity, the desired degradability, the portion of the downhole tool 100 (FIG. 1) comprising the cast degradable elastomer, the presence of other additives, and the like, and any combination thereof.

A reinforcing agent may additionally be included in the cast degradable elastomer, which may increase the strength, stiffness, or salt creep resistance of the sealing element 285 and/or portion of the body 210 comprising at least a portion of the cast degradable elastomer. Such reinforcing agents may be a particulate, a fiber, a fiber weaver, and any combination thereof.

The particulate may be of any size suitable for embedding in the cast degradable elastomer, such as from about 400 mesh to about 40 mesh, U.S. Sieve Series, and encompassing any value or subset therebetween. For example, the particulate may be sized in the range of from about 400 mesh to 100 mesh, or about 100 mesh to about 50 mesh, or about 50 mesh to about 40 mesh, encompassing any value and subset therebetween. Moreover, there is no need for the particulates to be sieved or screened to a particular or specific particle mesh size or particular particle size distribution, but rather a wide or broad particle size distribution can be used, although a narrow particle size distribution is also suitable.

In some embodiments, the particulates may be substantially spherical or non-spherical. Substantially non-spherical proppant particulates may be cubic, polygonal, or any other non-spherical shape. Such substantially non-spherical particulates may be, for example, cubic-shaped, rectangular-shaped, rod-shaped, ellipse-shaped, cone-shaped, pyramid-shaped, planar-shaped, oblate-shaped, or cylinder-shaped. That is, in embodiments wherein the particulates are substantially non-spherical, the aspect ratio of the material may range such that the material is planar to such that it is cubic, octagonal, or any other configuration.

Particulates suitable for use as reinforcing agents in the embodiments described herein may comprise any material suitable for use in the cast degradable elastomer that provides one or more of stiffness, strength, or creep resistance, or any other added benefit. Suitable materials for these particulates may include, but are not limited to, organophilic clay, silica flour, metal oxide, sand, bauxite, ceramic materials, glass materials, polymer materials (e.g., ethylene vinyl acetate or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof.

The fibers for use as reinforcing agents in the cast degradable elastomer may be of any size and material capable of being included therein. In some embodiments, the fibers may have a length of less than about 1.25 inches and a width of less than about 0.01 inches. In some embodiments, a mixture of different sizes of fibers may be used. Suitable fibers may be formed from any material suitable for use as a particulate, as described previously, as well as materials including, but not limited to, carbon fibers, carbon nanotubes, graphene, fullerene, a ceramic fiber, a plastic fiber, a glass fiber, a metal fiber, and any combination thereof. In some embodiments, the fibers may be woven together to form a fiber weave for use in the cast degradable elastomer.

In some embodiments, the reinforcing agent may be included in the cast degradable elastomer in an amount of from about 1% to about 91% by weight of the cast degradable elastomer, encompassing any value or subset therebetween. For example, reinforcing agent may be included in an amount of from about 1% to about 30%, or about 30% to about 60%, or about 60% to about 91% by weight of the cast degradable elastomer, encompassing any value and subset therebetween. Each of these values is critical to the embodiments of the present disclosure and may depend on a number of factors including, but not limited to, the desired stiffness of the cast degradable elastomer, the desired strength of the cast degradable elastomer, the desired salt creep resistance of the cast degradable elastomer, the type of cast degradable elastomer selected, the type of downhole tool having the cast degradable elastomer included therein, and the like, and any combination thereof.

In some embodiments, the sealing element 285 may be at least partially encapsulated in a second material (e.g., a "sheath") formed from an encapsulating material capable of protecting or prolonging degradation of the sealing element 285 and/or portion of the body 210 in a wellbore environment. As used herein, the term "at least partially encapsulated" with reference to an encapsulating material, means that at least 50% of an outer surface of a component of a downhole tool (i.e., the sealing element or a component of the body) is covered with the encapsulating material. The sheath may also serve to protect the sealing element 285 and/or portion of the body 210 from abrasion within the wellbore 120. The structure of the sheath may be permeable, frangible, or of a material that is at least partially removable at a desired rate within the wellbore environment. Whatever the structure, the sheath is designed such that it does not interfere with the ability of the sealing element 285 to form a fluid seal in the wellbore 120, or the body 210 to perform its necessary function. The encapsulating material forming the sheath may be any material capable of use in a downhole environment and, depending on the structure of the sheath may, or may not, be elastic such that it expands, such as when used to encapsulate the sealing element 285. For example, a frangible sheath may break as the sealing element 285 expands to form a fluid seal, whereas a permeable sheath may remain in place on the sealing element 285 as it forms the fluid seal. As used herein, the term "permeable" refers to a structure that permits fluids (including liquids and gases) therethrough and is not limited to any particular configuration.

The encapsulating material forming the sheath may be of any material that the sealing element 285 or body 210 itself may be made of, as described above and below herein, including the cast degradable elastomer materials having thermoplastic polymers and/or reinforcing agents embedded therein. For example, the sheath may be made of a cast degradable material that degrades faster than the cast degradable material forming a sealing element 285. Other suitable encapsulating materials may include, but are not limited to, a wax, a drying oil, a polyurethane, a crosslinked partially hydrolyzed polyacrylic, a silicate material, a glass material, an inorganic durable material, a polymer, a polylactic acid, a polyvinyl alcohol, a polyvinylidene chloride, and any combination thereof.

In some embodiments, the body 210, or a portion thereof, may also be composed of a cast degradable material or other degradable material type. However, unlike the sealing element 285, the body 210 is sufficiently rigid to provide structural integrity to the downhole tool, or frac plug 200. The body 210 may degrade in the wellbore environment such as when exposed to one or more of the stimuli capable of degrading the cast degradable elastomers described above, including an aqueous fluid, an elevated wellbore temperature, a hydrocarbon fluid, and the like. The aqueous fluid may be any aqueous fluid present in the wellbore environment including, but not limited to, those listed above: fresh water, saltwater, brine, seawater, or combinations thereof. The body 210 may thermally degrade in a wellbore environment having temperatures greater than about 75° C. (or about 165° F.). The body 210 may also degrade upon contact with a hydrocarbon fluid in the wellbore environment. In such cases, the hydrocarbon fluid may include, but is not limited to, alkanes, olefins, aromatic organic compounds, cyclic alkanes, paraffins, diesel fluids, mineral oils, desulfurized hydrogenated kerosenes, and any combination thereof.

Suitable materials for forming the body 210 may include, but are not limited to, a cast degradable elastomer, a polysaccharide, chitin, chitosan, a protein, an aliphatic polyester, poly($\epsilon$-caprolactone), a poly(hydroxybutyrate), poly(ethyleneoxide), poly(phenyllactide), a poly(amino acid), a poly(orthoester), polyphosphazene, a polylactide, a polyglycolide, a poly(anhydride) (e.g., poly(adipic anhydride), poly(suberic anhydride), poly(sebacic anhydride), poly(dodecanedioic anhydride), poly(maleic anhydride), and poly(benzoic anhydride), and the like), a polyepichlorohydrin, a copolymer of ethylene oxide/polyepichlorohydrin, a terpolymer of epichlorohydrin/ethylene oxide/allyl glycidyl ether, and any combination thereof. Suitable materials for forming the body 210 may also include, but are not limited to, metals or metal alloys that include magnesium, aluminum, iron, nickel, copper, gallium, zinc, zirconium, and the like, and any combination thereof. Combinations of the foregoing polymers and metals/metal alloys may be used in forming the body 210.

In some embodiments, the body 210 may release an accelerant during degradation that accelerates the degradation of the sealing element 285. In other embodiments, the sealing element 285 may release an accelerant that accelerates the degradation of the body 210. In some cases, the accelerant is a natural component that is released upon degradation of either the body 210 or the sealing element 285, such as an acid (e.g., release of an acid upon degradation of the body 210 formed from a polylactide). Similarly, the body 210 may release a base that would aid in degrading the sealing element 285, such as, for example, if the body 210 were composed of a galvanically reacting material. In other cases, the accelerant may be embedded in the material forming either or both of the body 210 and the sealing element 285. The accelerant may be in any form, including a solid or a liquid. In other embodiments, the accelerant can be a natural byproduct of the degradation of the material and is not specifically added to act as an accelerant.

Suitable accelerants may include, but are not limited to, a crosslinker, sulfur, a sulfur releasing agent, a peroxide, a peroxide releasing agent, a catalyst, an acid, an acid releasing agent, a base, a base releasing agent, and any combination thereof. In some embodiments, the accelerant may cause the body 210 or the sealing element 285 to become brittle to aid in degradation. Specific accelerants may include, but are not limited to, a polylactide, a polyglycolide, an ester, a cyclic ester, a diester, an anhydride, a lactone, an amide, an anhydride, an alkali metal alkoxide, a carbonate, a bicarbonate, an alcohol, an alkali metal hydroxide, ammonium hydroxide, sodium hydroxide, potassium hydroxide, an amine, an alkanol amine, an inorganic acid or precursor thereof (e.g., hydrochloric acid, hydrofluoric acid, ammonium bifluoride, and the like), an organic acid or precursor thereof (e.g., formic acid, acetic acid, lactic acid, glycolic acid, aminopolycarboxylic acid, polyaminopolycarboxylic acid, and the like), and any combination thereof. As an example, the degradation of a cast polyurethane elastomer (e.g., forming all or a portion of the sealing element 285) can produce adipic acid, succinic acid, or isophthalic acid during its degradation, and the released acid will lower the pH of a wellbore fluid (introduced or naturally occurring, such as produced wellbore fluids) and accelerate the degradation of an aluminum alloy or magnesium alloy forming all or a portion of the body 210.

The accelerant, when embedded in the body 210 or the sealing element 285, may be present in the range of from about 0.01% to about 25% by weight of the material forming the body 210 or the sealing element 285, encompassing any value and subset therebetween. For example, the accelerant may be present of from about 0.01% to about 5%, or about 5% to about 10%, or about 10% to about 25% by weight of the material forming the body 210 or the sealing element 285, encompassing any value and subset therebetween. Each of these values is critical to the embodiments of the present disclosure and may depend on a number of factors including, but not limited to, the material forming the body 210 and/or the sealing element 285, the desired degradation rate of the body 210 and/or the sealing element 285, and the like, and any combination thereof.

Each of the individual components forming the body 210 and the sealing element 285 (i.e., the primary material and any additional material embedded therein) is preferably present in the body 210 and the sealing element 285 uniformly (i.e., distributed uniformly throughout). The choices and relative amounts of each component are adjusted for the particular downhole operation (e.g., fracturing, workover, and the like) and the desired degradation rate (i.e., accelerated, rapid, or normal) of the body 210 and/or sealing element 285. Factors that may affect the selection and amount of components may include, for example, the temperature of the subterranean formation in which the downhole operation is being performed, the expected amount of aqueous and/or hydrocarbon fluid in the wellbore environment, the amount of elasticity required for the sealing element 285 (e.g., based on wellbore diameter, for example), the duration of the downhole operation, and the like.

Figure 3:
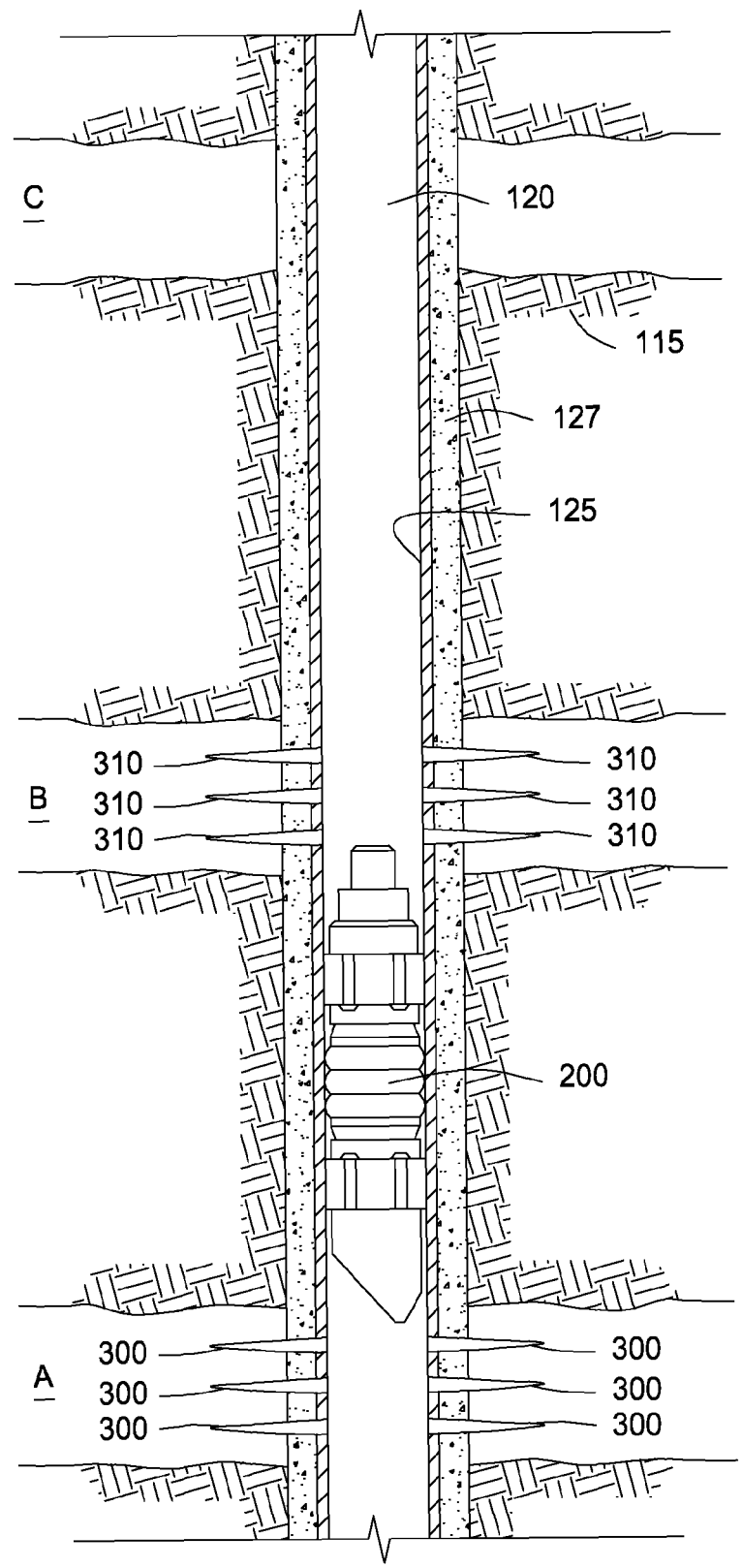
FIG. 3 shows an enlarged cross-sectional view of a downhole tool in operation, according to one or more embodiments described herein.

Referring again to FIG. 2, in operation the frac plug 200 may be used in a downhole fracturing operation to isolate a zone of the formation 115 below the frac plug 200. Referring now to FIG. 3, with continued reference to FIG. 2, the frac plug 200 is shown disposed between producing zone A and producing zone B in formation 115. In a conventional fracturing operation, before, after, or in conjunction with setting the frac plug 200 to isolate zone A from zone B, a plurality of perforations 300 are made by a perforating tool (not shown) through the casing 125 and cement 127 to extend into producing zone A. Then a well stimulation fluid is introduced into the wellbore 120, such as by lowering a tool (not shown) into the wellbore 120 for discharging the fluid at a relatively high pressure or by pumping the fluid directly from the derrick 112 (FIG. 1) into the wellbore 120. The well stimulation fluid passes through the perforations 300 into producing zone A of the formation 115 for stimulating the recovery of fluids in the form of oil and gas containing hydrocarbons. These production fluids pass from zone A, through the perforations 300, and up the wellbore 120 for recovery at the surface 105 (FIG. 1).

The frac plug 200 is then lowered by the tool string 118 (FIG. 1) to the desired depth within the wellbore 120, and the sealing element 285 (FIG. 2) is set against the casing 125, thereby isolating zone A as depicted in FIG. 3. Due to the design of the frac plug 200, the flowbore 205 (FIG. 2) of the frac plug 200 allows fluid from isolated zone A to flow upwardly through the frac plug 200 while preventing flow downwardly into the isolated zone A. Accordingly, the production fluids from zone A continue to pass through the perforations 300, into the wellbore 120, and upwardly through the flowbore 205 of the frac plug 200, before flowing into the wellbore 120 above the frac plug 200 for recovery at the surface 105.

After the frac plug 200 is set into position, as shown in FIG. 3, a second set of perforations 310 may then be formed through the casing 125 and cement 127 adjacent intermediate producing zone B of the formation 115. Zone B is then treated with well stimulation fluid, causing the recovered fluids from zone B to pass through the perforations 310 into the wellbore 120. In this area of the wellbore 120 above the frac plug 200, the recovered fluids from zone B will mix with the recovered fluids from zone A before flowing upwardly within the wellbore 120 for recovery at the surface 105.

If additional fracturing operations will be performed, such as recovering hydrocarbons from zone C, additional frac plugs 200 may be installed within the wellbore 120 to isolate each zone of the formation 115. Each frac plug 200 allows fluid to flow upwardly therethrough from the lowermost zone A to the uppermost zone C of the formation 115, but pressurized fluid cannot flow downwardly through the frac plug 200.

After the fluid recovery operations are complete, the frac plug 200 must be removed from the wellbore 120. In this context, as stated above, at least a portion of the sealing element 285 and/or body 210 (FIG. 2) of the frac plug 200 may degrade by exposure to the wellbore environment. For example, the sealing element 285 and/or the body 210 may degrade upon prolonged contact with fluids present naturally or introduced in the wellbore 120, or other conditions in the wellbore 120. Other combinations of degradability are suitable, without departing from the scope of the present disclosure, as discussed above, for example.

Accordingly, in an embodiment, the frac plug 200 is designed to decompose over time while operating in a wellbore environment, thereby eliminating the need to mill or drill the frac plug 200 out of the wellbore 120. Thus, by exposing the frac plug 200 to the wellbore environment, at least some of its components will decompose, causing the frac plug 200 to lose structural and/or functional integrity and release from the casing 125. The remaining components of the frac plug 200 will simply fall to the bottom of the wellbore 120. In various alternate embodiments, degrading one or more components of a downhole tool 100 performs an actuation function, opens a passage, releases a retained member, or otherwise changes the operating mode of the downhole tool 100. Also, as described above, the material or components embedded therein for forming the body 210 and sealing element 285 of the frac plug 200, as well as the use of the optional sheath, may be selected to control the decomposition rate of the frac plug 200.

Referring again to FIG. 1, removing the downhole tool 100 from its attachment in the wellbore 120 is more cost effective and less time consuming than removing conventional downhole tools, which require making one or more trips into the wellbore 120 with a mill or drill to gradually grind or cut the tool away. Instead, the downhole tools 100 described herein are removable by simply exposing the tools 100 to a naturally occurring or standard downhole environment (e.g., fluids present in a standard downhole operation, temperature, pressures, salinity, and the like) over time. The foregoing descriptions of specific embodiments of the downhole tool 100, and the systems and methods for removing the biodegradable tool 100 from the wellbore 120 have been presented for purposes of illustration and description and are not intended to be exhaustive or to limit this disclosure to the precise forms disclosed. Many other modifications and variations are possible. In particular, the type of downhole tool 100, or the particular components that make up the downhole tool 100 (e.g., the body and sealing element) may be varied. For example, instead of a frac plug 200 (FIG. 2), the downhole tool 100 may comprise a bridge plug, which is designed to seal the wellbore 120 and isolate the zones above and below the bridge plug, allowing no fluid communication in either direction. Alternatively, the biodegradable downhole tool 100 could comprise a packer that includes a shiftable valve such that the packer may perform like a bridge plug to isolate two formation zones, or the shiftable valve may be opened to enable fluid communication therethrough. Similarly, the downhole tool 100 could comprise a wiper plug or a cement plug.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include Embodiment A, Embodiment B, and Embodiment C.

Embodiment A

A downhole tool comprising: a body, wherein at least a portion of the body is degradable when exposed to a wellbore environment; and at least one degradable sealing element comprising a cast degradable elastomer, wherein at least a portion of the cast degradable sealing element degrades when exposed to the wellbore environment.

Embodiment B

A method comprising: installing a downhole tool in a wellbore, wherein the downhole tool comprises a body and at least one degradable sealing element comprising a cast degradable elastomer, and wherein at least a portion of the body and the degradable sealing element are degradable when exposed to a wellbore environment; fluidly sealing two sections of the wellbore with the degradable sealing element of the downhole tool, the degradable sealing element capable of holding a differential pressure; performing a downhole operation; and degrading at least a portion of the degradable sealing element such that the degradable sealing element no longer is capable of holding the differential pressure.

Embodiment C

A system comprising: a wellbore; and a downhole tool capable of being disposed in the wellbore to fluidly seal two sections thereof, the downhole tool comprising a body and at least one degradable sealing element comprising a cast degradable elastomer and the degradable sealing element capable of holding a differential pressure, wherein at least a portion of the body and at least a portion of the degradable sealing element are degradable when exposed to a wellbore environment.

Embodiments A, B, and C may have one or more of the following additional elements in any combination:

Element 1: Further comprising degrading at least a portion of the portion of the body that is degradable.

Element 2: Wherein the cast degradable elastomer is selected from the group consisting of a polyurethane rubber; a polyester-based polyurethane rubber; a polyether-based polyurethane rubber; a thiol-based polymer; a hyaluronic acid rubber; a polyhydroxobutyrate rubber; a polyester elastomer; a polyester amide elastomer; a starch-based resin; a polyethylene terephthalate polymer; a polyester thermoplastic; copolymers thereof; terpolymers thereof; and any combination thereof.

Element 3: Wherein the cast degradable elastomer is a polyurethane rubber, a polyester-based polyurethane rubber, or a polyether-based rubber.

Element 4: Wherein the cast degradable elastomer is a thiol-based polymer.

Element 5: Wherein the cast degradable elastomer further comprises a thermoplastic polymer embedded therein.

Element 6: Wherein cast degradable elastomer further comprises a reinforcing agent embedded therein.

Element 7: Wherein the degradable sealing element is at least partially encapsulated in an encapsulating material, and wherein the encapsulating material delays degradation of the degradable sealing element.

Element 8: Wherein the portion of the body that is degradable releases an accelerant during degradation, and wherein the accelerant accelerates the degradation of the degradable sealing element; or wherein the degradable sealing element releases an accelerant during degradation, and wherein the accelerant accelerates the degradation of the portion of the body that is degradable.

Element 9: Wherein the downhole tool is a wellbore isolation device.

Element 10: Wherein the wellbore isolation device is a frac plug, a bridge plug, or a packer, a wiper plug, or a cement plug.

Element 11: Wherein the degradable sealing element has a Shore A durometer hardness of from about 60 to about 100.

Element 12: Wherein the cast degradable elastomer is a polyurethane rubber, a polyester-based polyurethane rubber, or a polyether-based rubber comprising at least polyol and polyisocyanate, and wherein and the amount of polyol is included in an amount of from about 0.25 to about 2 of the polyisocyanate.

Element 13: Wherein the cast degradable elastomer is a thiol-based polymer comprising thiol functional groups in an amount of from about 1 to about 22.

Element 14: Wherein the cast degradable elastomer further comprises a thermoplastic polymer in an amount of from about 1% to about 91% by weight of the cast degradable elastomer.

Element 15: Wherein the cast degradable elastomer further comprises a particulate reinforcing agent having a size of from about 400 mesh to about 40 mesh, U.S. Sieve Series.

Element 16: Wherein the cast degradable elastomer further comprises a reinforcing agent in an amount of from about 1% to about 91% by weight of the cast degradable elastomer.

Element 17: Wherein one or both of the body and/or the degradable sealing element comprises an accelerant of from about 0.01% to about 25% by weight of the material forming the body and/or the degradable sealing element.

By way of non-limiting example, exemplary combinations of the above elements, which combinations are applicable to Embodiments A, B, and C, include: 1 and 2; 1 and 3; 1 and 4; 1 and 5; 1 and 6; 1 and 7; 1 and 8; 1 and 9; 1 and 10; 1 and 11; 1 and 12; 1 and 13; 1 and 14; 1 and 15; 1 and 16; 1 and 17; 2 and 3; 2 and 4; 2 and 5; 2 and 6; 2 and 7; 2 and 8; 2 and 9; 2 and 10; 2 and 11; 2 and 12; 2 and 13; 2 and 14; 2 and 15; 2 and 16; 2 and 17; 3 and 4; 3 and 5; 3 and 6; 3 and 7; 3 and 8; 3 and 9; 3 and 10; 3 and 11; 3 and 12; 3 and 13; 3 and 14; 3 and 15; 3 and 16; 3 and 17; 4 and 5; 4 and 6; 4 and 7; 4 and 8; 4 and 9; 4 and 10; 4 and 11; 4 and 12; 4 and 13; 4 and 14; 4 and 15; 4 and 16; 4 and 17; 5 and 6; 5 and 7; 5 and 8; 5 and 9; 5 and 10; 5 and 11; 5 and 12; 5 and 13; 5 and 14; 5 and 15; 5 and 16; 5 and 17; 6 and 7; 6 and 8; 6 and 9; 6 and 10; 6 and 11; 6 and 12; 6 and 13; 6 and 14; 6 and 15; 6 and 16; 6 and 17; 7 and 8; 7 and 9; 7 and 10; 7 and 11; 7 and 12; 7 and 13; 7 and 14; 7 and 15; 7 and 16; 7 and 17; 8 and 9; 8 and 10; 8 and 11; 8 and 12; 8 and 13; 8 and 14; 8 and 15; 8 and 16; 8 and 17; 9 and 10; 9 and 11; 9 and 12; 9 and 13; 9 and 14; 9 and 15; 9 and 16; 9 and 17; 10 and 11; 10 and 12; 10 and 13; 10 and 14; 10 and 15; 10 and 16; 10 and 17; 11 and 12; 11 and 13; 11 and 14; 11 and 15; 11 and 16; 11 and 17; 12 and 13; 12 and 14; 12 and 15; 12 and 16; 12 and 17; 13 and 14; 13 and 15; 13 and 16; 13 and 17; 14 and 15; 14 and 16; 14 and 17; 15 and 16; 15 and 17; 16 and 17; 1, 3, 5, and 6; 2, 9, and 10; 4, 6, 8, and 9; 1, 2, 3, 4, 5, 6, 7, 8, 9, 10, 11, 12, 13, 14, 15, 16, and 17; 1, 4, 8, and 11; 3, 5, 7, 8, 10 and 11; 4, 5, 9, and 12; 2, 8, 10, and 12; 3, 7, 14, and 16; 13, 14, 15, and 17; 3, 7, 11; and 16; and the like.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A downhole tool comprising:
a body, wherein at least a portion of the body is degradable when exposed to a wellbore environment; and
at least one degradable sealing element disposed on the body, the at least one degradable sealing element comprising a thermoset cast degradable elastomer, wherein at least a portion of the thermoset cast degradable sealing element degrades when exposed to the wellbore environment.

2. The downhole tool of claim 1, wherein the thermoset cast degradable elastomer is selected from the group consisting of a polyurethane rubber; a polyester-based polyurethane rubber; a polyether-based polyurethane rubber; a thiol-based polymer; a hyaluronic acid rubber; a polyhydroxobutyrate rubber; a polyester elastomer; a polyester amide elastomer; a starch-based resin; a polyethylene terephthalate polymer; copolymers thereof; terpolymers thereof; and any combination thereof.

3. The downhole tool of claim 1, wherein the thermoset cast degradable elastomer is a polyurethane rubber, a polyester-based polyurethane rubber, or a polyether-based rubber.

4. The downhole tool of claim 1, wherein the thermoset cast degradable elastomer is a thiol-based polymer.

5. The downhole tool of claim 1, wherein the thermoset cast degradable elastomer further comprises a thermoplastic polymer embedded therein.

6. The downhole tool of claim 1, wherein the thermoset cast degradable elastomer further comprises a reinforcing agent embedded therein.

7. The downhole tool of claim 1, wherein the degradable sealing element is at least partially encapsulated in an encapsulating material, and wherein the encapsulating material delays degradation of the degradable sealing element.

8. The downhole tool of claim 1, wherein the portion of the body that is degradable releases an accelerant during degradation, and wherein the accelerant accelerates the degradation of the degradable sealing element; or wherein the degradable sealing element releases an accelerant during degradation, and wherein the accelerant accelerates the degradation of the portion of the body that is degradable.

9. The downhole tool of claim 1, wherein the downhole tool is a wellbore isolation device.

10. The downhole tool of claim 9, wherein the wellbore isolation device is a frac plug, a bridge plug, or a packer, a wiper plug, or a cement plug.

11. A method comprising:
installing a downhole tool in a wellbore, wherein the downhole tool comprises a body and at least one degradable sealing element comprising a thermoset cast degradable elastomer disposed on the body, and wherein at least a portion of the body and the degradable sealing element are degradable when exposed to a wellbore environment;
fluidly sealing two sections of the wellbore with the degradable sealing element of the downhole tool, the degradable sealing element capable of holding a differential pressure;
performing a downhole operation; and
degrading at least a portion of the degradable sealing element such that the degradable sealing element no longer is capable of holding the differential pressure.

12. The method of claim 11, further comprising degrading at least a portion of the portion of the body that is degradable.

13. The method of claim 11, wherein the thermoset cast degradable elastomer is selected from the group consisting of a polyurethane rubber; a polyester-based polyurethane rubber; a polyether-based polyurethane rubber; a thiol-based polymer; a hyaluronic acid rubber; a polyhydroxobutyrate rubber; a polyester elastomer; a polyester amide elastomer; a starch-based resin; a polyethylene terephthalate polymer; copolymers thereof; terpolymers thereof; and any combination thereof.

14. The method of claim 11, wherein the thermoset cast degradable elastomer is a polyurethane rubber, a polyester-based polyurethane rubber, or a polyether-based rubber.

15. The method of claim 11, wherein the thermoset cast degradable elastomer is a thiol-based polymer.

16. The method of claim 11, wherein the thermoset cast degradable elastomer further comprises a thermoplastic polymer embedded therein.

17. The method of claim 11, wherein thermoset cast degradable elastomer further comprises a reinforcing agent embedded therein.

18. The method of claim 11, wherein the degradable sealing element is at least partially encapsulated in an encapsulating material, and wherein the encapsulating material delays degradation of the degradable sealing element.

19. The method of claim 11, wherein the portion of the body that is degradable releases an accelerant during degradation, and wherein the accelerant accelerates the degradation of the degradable sealing element; or wherein the degradable sealing element releases an accelerant during degradation, and wherein the accelerant accelerates the degradation of the portion of the body that is degradable.

20. A system comprising:
a wellbore; and
a downhole tool capable of being disposed in the wellbore to fluidly seal two sections thereof, the downhole tool comprising a body and at least one degradable sealing element disposed on the body, the at least one degradable sealing element comprising a thermoset cast degradable elastomer and the degradable sealing element capable of holding a differential pressure,
wherein at least a portion of the body and at least a portion of the degradable sealing element are degradable when exposed to a wellbore environment.

21. The system of claim 20, wherein the thermoset cast degradable elastomer is selected from the group consisting of a polyurethane rubber; a polyester-based polyurethane rubber; a polyether-based polyurethane rubber; a thiol-based polymer; a hyaluronic acid rubber; a polyhydroxobutyrate rubber; a polyester elastomer; a polyester amide elastomer; a starch-based resin; a polyethylene terephthalate polymer; copolymers thereof; terpolymers thereof; and any combination thereof.

22. The system of claim 20, wherein the thermoset cast degradable elastomer is a polyurethane rubber, a polyester-based polyurethane rubber, or a polyether-based rubber.

23. The system of claim 20, wherein the thermoset cast degradable elastomer is a thiol-based polymer.

24. The system of claim 20, wherein the thermoset cast degradable elastomer further comprises a thermoplastic polymer embedded therein.

25. The system of claim 20, wherein the thermoset cast degradable elastomer further comprises a reinforcing agent embedded therein.

26. The system of claim 20, wherein the degradable sealing element is at least partially encapsulated in an encapsulating material, and wherein the encapsulating material delays degradation of the degradable sealing element.

27. The system of claim 20, wherein the portion of the body that is degradable releases an accelerant during degradation, and wherein the accelerant accelerates the degradation of the degradable sealing element; or wherein the degradable sealing element releases an accelerant during degradation, and wherein the accelerant accelerates the degradation of the portion of the body that is degradable.

* * * * *